(12) United States Patent
Vu

(10) Patent No.: US 6,785,674 B2
(45) Date of Patent: Aug. 31, 2004

(54) SYSTEM AND METHOD FOR STRUCTURING DATA IN A COMPUTER SYSTEM

(75) Inventor: Jonathan Vu, Fairfax, VA (US)

(73) Assignee: InteliTrac, Inc., Rockville, MD (US)

( * ) Notice: Subject to any disclaimer, the term of this patent is extended or adjusted under 35 U.S.C. 154(b) by 0 days.

(21) Appl. No.: 10/346,260

(22) Filed: Jan. 17, 2003

(65) Prior Publication Data

US 2004/0143582 A1 Jul. 22, 2004

(51) Int. Cl.[7] .............................................. G06F 17/30
(52) U.S. Cl. ................................................ 707/3; 707/4
(58) Field of Search ................................. 707/1, 2, 3, 4, 707/5, 6, 7, 8, 9, 10, 100, 101, 102, 103, 104

(56) References Cited

U.S. PATENT DOCUMENTS

| | | | | |
|---|---|---|---|---|
| 5,488,717 A | * | 1/1996 | Gibson et al. | 707/2 |
| 6,249,788 B1 | * | 6/2001 | Ronstrom | 707/101 |
| 6,480,849 B1 | * | 11/2002 | Lee et al. | 707/8 |
| 6,581,063 B1 | * | 6/2003 | Kirkman | 707/100 |

* cited by examiner

Primary Examiner—Charles Rones
Assistant Examiner—Yicun Wu
(74) Attorney, Agent, or Firm—DeWitt Roggin, PLLC; Timothy R. DeWitt

(57) ABSTRACT

A method and system for creating and searching a central linked list comprising a parent node which is situated at the center of a plurality of child nodes. Each child node has two double linked list pointers. One pointer points to the next child node, and the other pointer points to the parent node. Thus, matched data obtained at several child nodes moves immediately back to the parent simultaneously. The parent node contains the memory address and name of central linked list, a description of central linked list, and a description of the relationship between other parent nodes, as well as the relationship between each child node to its specific parent node. Each child node contains a node address, an attribute comprised of some or all of the stored data field and a link to the full data content that may reside on a file or in a database. Memory storage of the structure information is stored in system memory, such as, RAM. Thus, searching and comparison operations may be accomplished without the need to access a hard disk.

45 Claims, 8 Drawing Sheets

SYSTEM AND METHOD FOR STRUCTURING DATA IN A COMPUTER SYSTEM

FIELD OF THE INVENTION

The invention relates to methods and systems for structuring data, and more particularly to a method and system for accessing and storing data of a centralized linked list data structure in a computer system.

BACKGROUND OF THE INVENTION

There are many different forms of electronic data structures and each different data structure can have a myriad of implementations. One such data structure is in the form of a "list"—i.e., a grouping of ordered items that can be sequenced. A list that contains respective items and information to reach a prior or a subsequent item is referred to as a "linked list." With a "single linked list," each item only has a reference to the next list item. More sophisticated forms of electronic data structures are configured as a "double linked list" or "circular linked list" which consist of a chain of records (called nodes) in which the list is implemented by having a link to an adjacent data item.

FIG. 1 illustrates a double linked list. Each node 1, 2, 3 of the linked list includes content 10, 14, 18, and forward/backward pointers 12, 16 to the next node in the linked list. The last node 3 in the double linked list has a null pointer 20, i.e., it does not point to another node. A circular linked list is similar to the double linked list illustrated in FIG. 1, but differs from the double linked list in that the last node of the linked list has a pointer back to the first node.

The nodes of a linked list are connected like links of a chain; in the case of a circular linked list, the first pointer 12 is connected to last pointer 20 of the list illustrated in FIG. 1. Unlike the double linked list, in the case of a circular linked list, last pointer 20 points to the first node of the list. A linked list has a head pointer 8 for accessing that specific list. Head pointer 8 has linear links to subsequent nodes 2, 3, 4. The entire list is referenced from head 8.

Prior art linked list data structures, such as a double linked list and a circular linked list, operate systematically in the following manner. The beginning of the linked list is stored at head 8, which points to the first node 1. The first node 1 then points to the second node 2, and so forth, until reaching the last node 3. Though the linked list shown in FIG. 1 illustrates a list with head 8 and three nodes, it will be appreciated that additional nodes may be placed between head 8 and last node 3. This means that any node 1, 2, 3 can be accessed with a start at head 8 and follows the next pointer 12 to get to the queried pointer (12 or 16). While this may be systematic, it also means that there is a linear cost of operation—i.e., data is searched one item by item, starting from the beginning of the list and moving toward the end of the list. Thus, operations that rely on data towards the front of a linked list are fast, while operations that rely on data toward the end of a linked list will be slower.

In addition, prior art linked lists are typically implemented in databases, and are therefore stored in permanent memory devices. While such permanent memory devices, such as disk drives and tape drives, can provide large amounts of memory storage, they have proved to be slow in storing and accessing data when large linked lists, or large sets of linked lists, are used. In addition, such linked lists are structured with one or more layers of lists requiring large amounts of sequential data processing time.

An example of a prior art linked list data structures is disclosed in U.S. Pat. No. 6,249,788, entitled "Structure for a Database." The data structure described therein stores different data within an associated linked list in order to reduce the amount of sequential information searched. The described link list relates to a hierarchy of nodes consisting of a tree-structure which includes a root node, intermediate nodes and leaf nodes. An element of the root node establishes a link to a first intermediate node and then to subsequent intermediate node(s), which in turn link to a plurality of link nodes. Thus, such associated linked lists include sequential layers of data storage and therefore often require a great deal of processing time to search data of the linked list.

Prior art linked list data structures, such as that disclosed in U.S. Patent Application Publication No. 2002/0004793, entitled "Method and Apparatus for Organizing Data by Overlaying a Searchable Database with a Directory Tree Structure," assign multiple links between nodes. Pointers are used to link related data items. However, searching related data items still follows a branched path across several child nodes before returning to a parent node. Each step in the process requires added processing time. Moreover, when pointer bugs occur, it is often difficult to identify where the crash has occurred. Each linked must be sequentially tested until the bug is found. Thus, the debugging process can be both time and labor intensive.

Accordingly, there remains an unmet need in data structures for a fast, efficient and reliable data structure which does not suffer from the drawbacks described above.

SUMMARY OF THE INVENTION

In accordance with an embodiment of the invention, a central linked list comprises a parent node which is situated at the center of a plurality of child nodes. Each child node has two double linked list pointers. One pointer points to the next child node, and the other pointer points to the parent node. Thus, matched data obtained at several child nodes moves back to the parent simultaneously.

In accordance with another embodiment of the invention, the parent node contains the memory address and name of central linked list, a description of central linked list, and a description of the relationship between other parent nodes, as well as the relationship between each child node to its specific parent node. Each child node contains a node address, an attribute comprised of some or all of the stored data field and a link to the full data content that may reside on a file or in a database.

In accordance with yet another embodiment of the invention, memory storage of the structure information is stored in system memory, such as, random access memory (RAM). Thus, searching and comparison operations may be accomplished without the need to access data stored by a hard disk.

BRIEF DESCRIPTION OF THE DRAWINGS

Further objects, features and advantages of the invention will become apparent from the following detailed description taken in conjunction with the accompanying drawings showing illustrative embodiments of the invention, in which.

DETAILED DESCRIPTION

Central Linked List Data Structure

Figure 1:
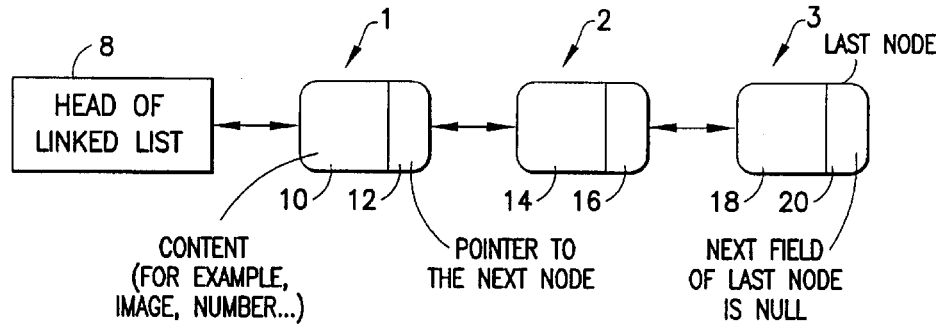
FIG. 1 illustrates a prior art double linked list data structure.
Figure 2:
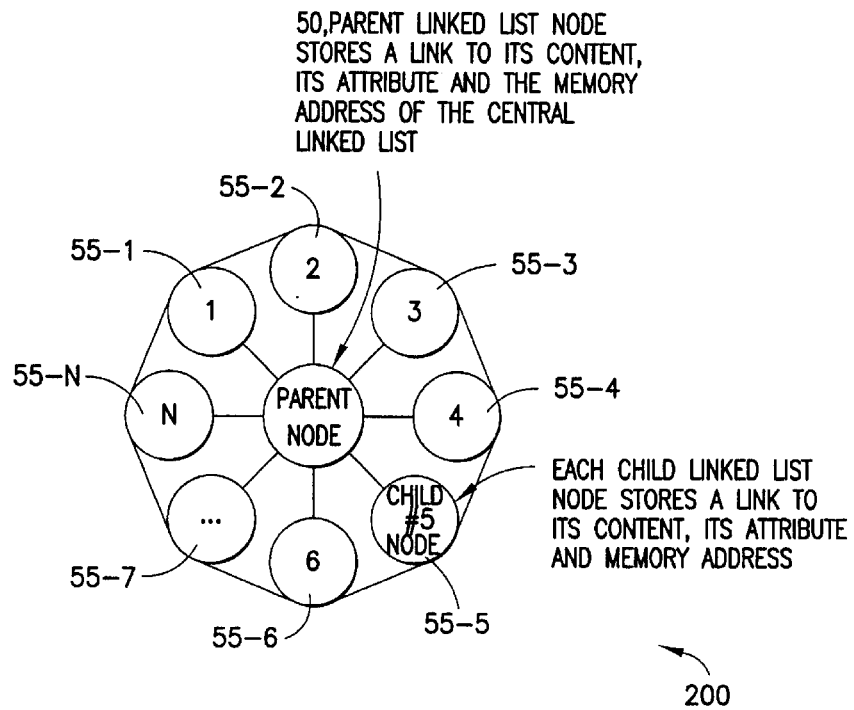
FIG. 2 illustrates a central linked list data structure in accordance with a first embodiment of the present invention.

FIG. 2 illustrates central linked list 200 in accordance with an embodiment of the invention. Central linked list 200 comprises parent node 50 which is situated at the center of N child nodes 55-1 through 55-N, where N is an integer that is greater than 1. Parent node 50 contains the memory address and name of central linked list 200, a description of central linked list 200, and a description of the relationship between other parent nodes (not shown), as well as the relationship between each child node 55 to its specific parent node. Each child node 55, which is linked to or situated around parent node 50, in accordance with an embodiment of the invention, contains a node address, an attribute comprised of some or all of the stored data fields and a link to the full data content that may reside on a file or in a database. In addition, each child node 55 has two double linked list pointers. One pointer points to the next child node (for example node 55-1 points or links to node 55-2), and the other pointer points or links to the parent node 50. Thus, matched data obtained at several child nodes moves immediately back to the parent simultaneously.

Memory storage of the structure information is stored in system memory, such as, in accordance with an embodiment of the invention, random access memory (RAM). Thus, searching and comparison operations may be accomplished without having to access a hard disk. As described more fully below, by remaining in system memory, processing time for storing and searching data is significantly decreased, as compared with effectuating such storing and searching in a system's hard drive or other storage device. In addition, extracting data from a hard disk only becomes necessary when a match based upon an attribute stored in system memory is found and the full data is not present in system memory.

Figure 3A:
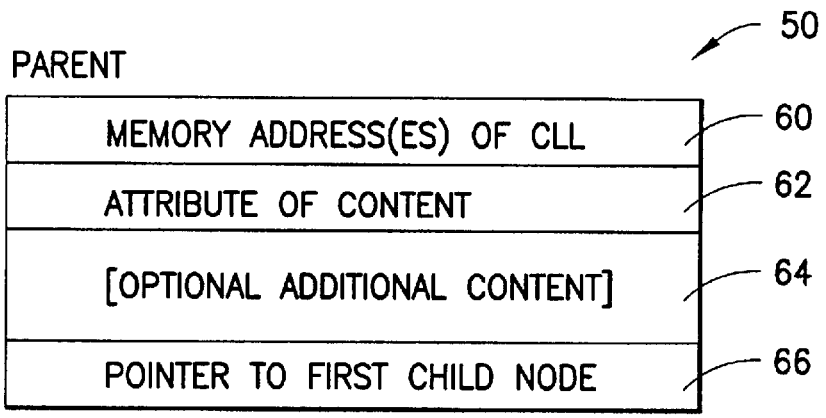
FIG. 3A illustrates the parent node of the central linked list data structure illustrated in FIG. 2.

FIG. 3A lists the content of parent node 50 in accordance with an embodiment of the invention. Parent node 50 may include, among other things, memory addresses of central linked list 60, one or more data fields 62, 64, and a pointer 66 linking to each child node 55 in central linked list 200. (Memory address 60 may also be referred to as the address of the area of memory.) Information contained by data fields 62, 64 includes the name or an identification of central linked list 200, text message and/or parameters of central linked list 200 (including the number and type (e.g., image, numbers, and other data types)) of child nodes 55, and description of the relationship of one parent node 50 to other parent node(s) 50, if any, as well as child node 55 relationships to their parent node 50.

Figure 3B:
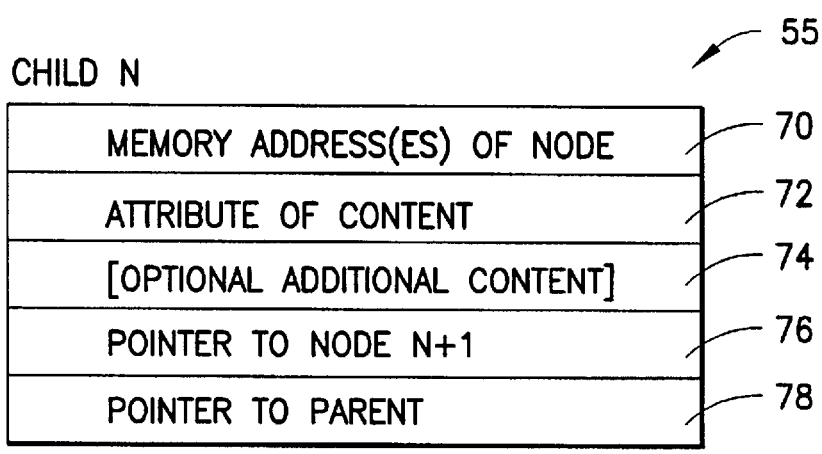
FIG. 3B illustrates a child node of the central linked list data structure illustrated in FIG. 2.

FIG. 3B illustrates the content of each child node 55. Each child node 55 in accordance with an embodiment of the invention includes its own memory address 70, one or more data fields 72, 74, a pointer 76 linking the child node 55 to the next child node 55 in central linked list and a pointer 78 linking the child node 55 to the parent node 50. A data field 72, 74, contains at least one attribute of the content for that node. As described above, the attribute of the node is stored in physical memory, such as RAM, and the content for that node, according to an embodiment of the present invention, may reside on a file or in a database in permanent memory.

Each child node 55 in central linked list 200 has two pointers—i.e., one pointer that points to the next node 76 (as shown in FIG. 3B), and a second pointer points to the central or parent node 78 (also shown in FIG. 3B). The last node 55-N, however, includes pointers to the first node and the parent node.

The content of each child node 55 is made up of one of a predetermined number of variables. For example, if an image is captured, node 55 stores: the node memory address in RAM, a digital attribute of the image, and a link to the stored actual image data. In this manner, as described more fully below with reference to FIGS. 6–7, a comparison may be performed between the captured image and a matched image that had been previously stored, and the matched image may be displayed on a real-time or substantially real-time basis. Specifically, the attribute of the images may be compared with the attributes of the images previously stored in a database using one or a plurality of data search algorithms including those algorithms well known in the art, such as a hash function algorithm, AVL algorithm, B– tree algorithm, B– plus algorithm, bubble sort algorithm, and the like. If, however, a single reading, e.g., hexadecimal, binary, or text, is used, then node 55 stores: a node identifier, a node address, and the actual reading as an attribute.

Figure 4:
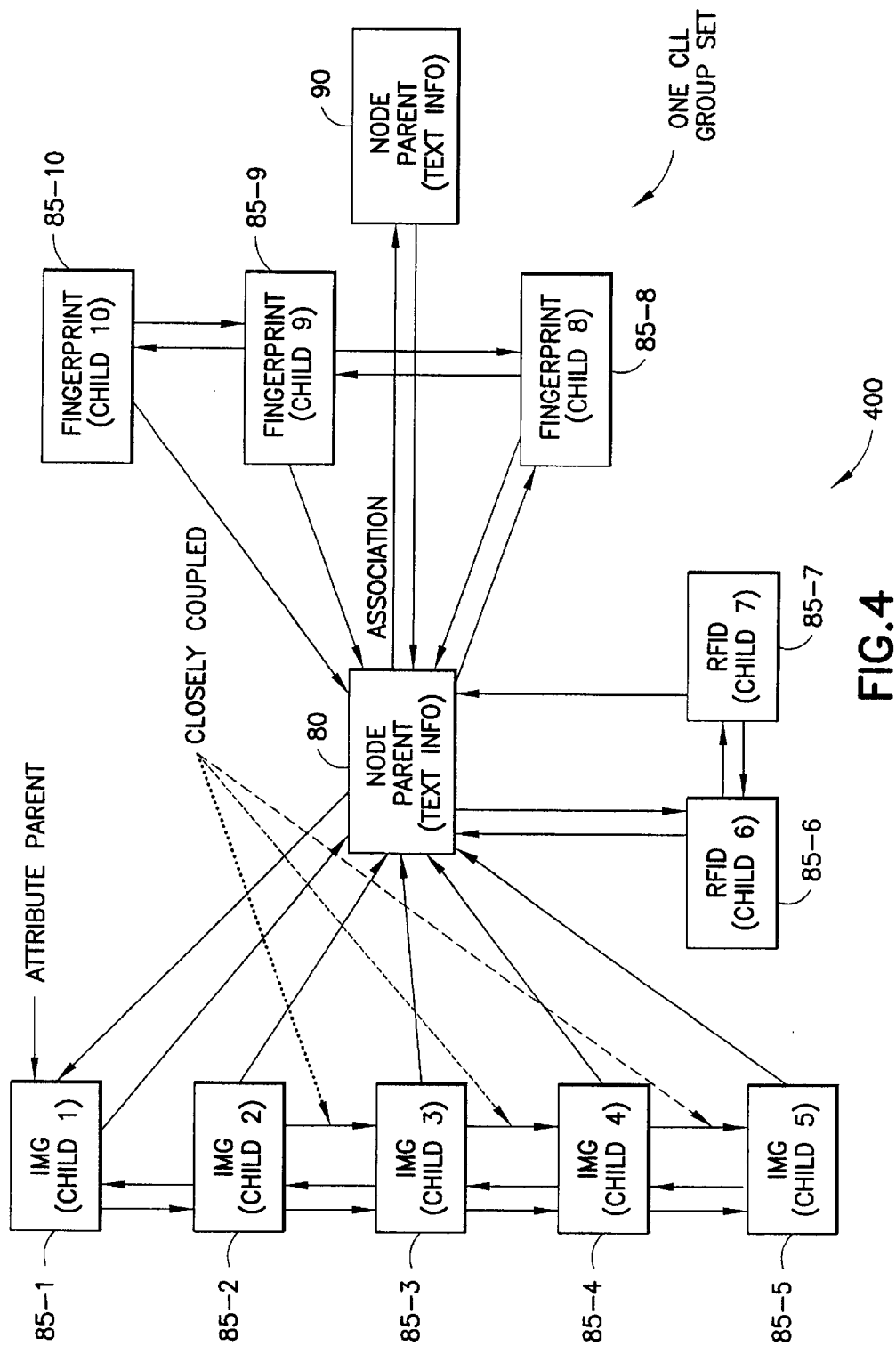
FIG. 4 illustrates a central linked list data structure in accordance with a second embodiment of the present invention.

FIG. 4 illustrates a data structure showing groupings of data using a data structure similar to the central linked list structure described with reference to FIGS. 2, 3A and 3B, above. Similar to central link list 200, central link list 400 includes parent node 80 having a plurality of child nodes, 85-1 through 85-10, situated around it. The data structure comprising parent node 80 and child nodes 85 is called herein a central linked list group set (or CLL group set).

In accordance with an embodiment of the invention, parent node 80 stores text information relating to list 400, such as the address of list 400, the name of list 400, the number of child nodes associated with list 400, and the type of data associated with each of the child nodes. The type of data (or data type) may relate to whether the data is text data, numerical data (integers, real numbers, etc.), alphanumeric strings (such as radio frequency identification (RFID), etc.), data relating to images (img), fingerprints or a topic of information (salaries, test scores, etc.). In addition, parent node 80 stores information concerning the description of its relationship with associated child nodes 85-1 through 85-10, as well as its relationship with other parent nodes—e.g., node 90.

Child nodes 85-1 through 85-10 may store various types of data. For example, as illustrated in FIG. 4, nodes 85-1 through 85-5 store image data, nodes 85-6 and 85-7 store RFID information and nodes 85-8 through 8-10 store fingerprint information.

The central linked list may be configured for groupings based on certain categories and/or other class properties, thereby allowing a system accessing the central linked list to perform relational data search in memory for increased security, performance and stability (as described below). Data may also be related based upon content and data type, as nodes are linked to central linked lists of the same group (also described below). For example, as illustrated in FIG. 4, each set of child nodes that are associated with a parent node having a common type of data is considered a closely coupled set of child nodes. Thus, in data structure 400, nodes 85-1 through 85-5 make up a closely coupled set of child nodes (relating to image data), nodes 85-6 and 85-7 make up another closely couple set of child nodes (relating to RFID information) and nodes 85-8 through 85-10 make up yet another closely coupled set of child nodes (relating to fingerprint information).

It should be noted that, in accordance with an embodiment of the invention, central linked lists may be grouped together—i.e., one group of central linked lists may be related to another group of central linked lists. Thus, one or more child nodes 85 of central linked list 400 may, for example, be associated with parent node 80 as well as parent 90. Moreover, in addition to being associated with another child node of the same group of central linked lists (e.g., node 85-6 being associated with node 85-7), a child node, such as node 85-6 within a group of central linked lists can be related to another child node in a different group of central linked lists (not shown).

System and Process for Accessing, Searching and Structuring Data

Figure 5:
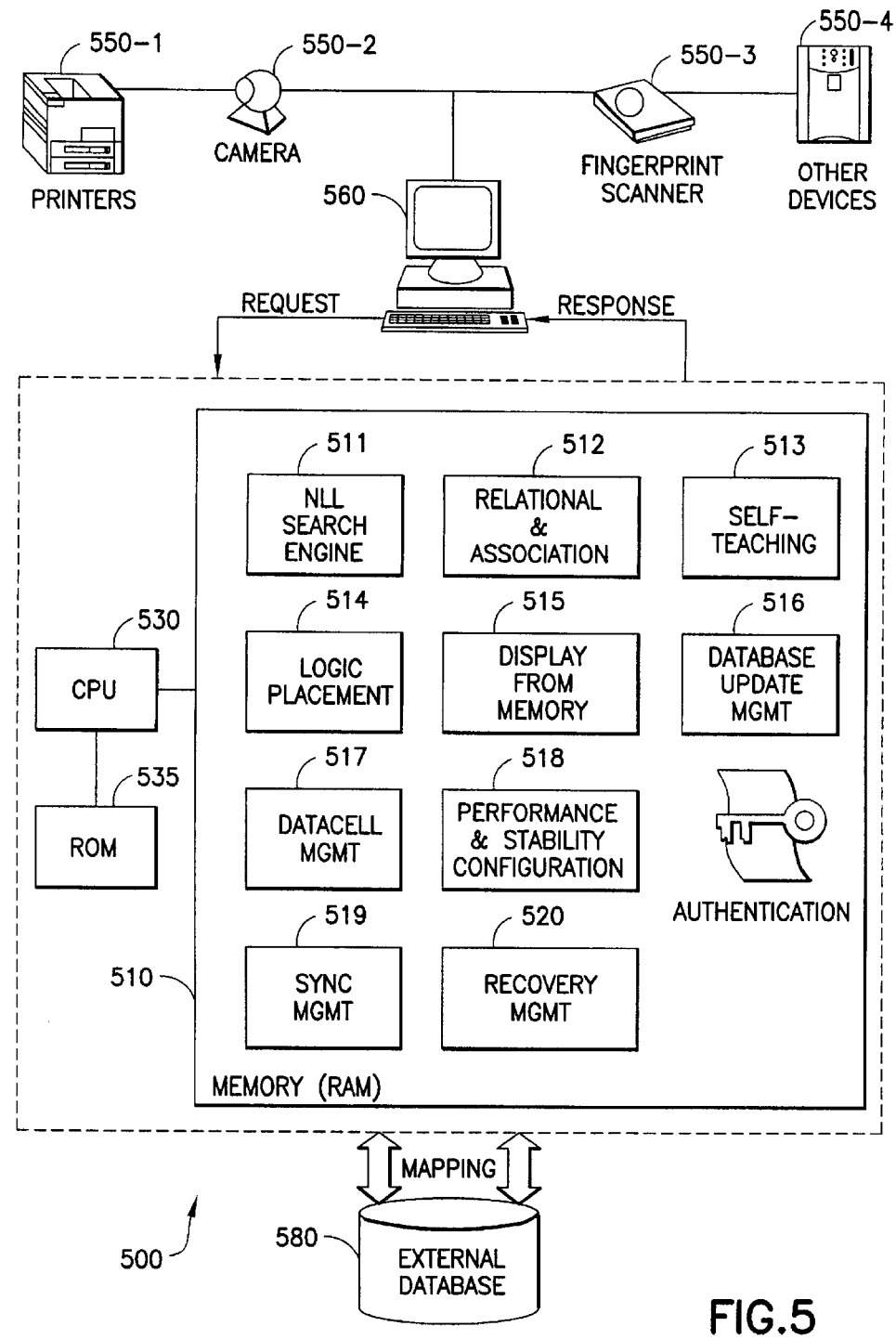
FIG. 5 illustrates an exemplary computer system in accordance with an embodiment of the present invention.

FIG. 5 illustrates an exemplary computer system 500 configured for accessing, searching and storing data (function 511) using a central linked list, such as list 200 of FIG. 2, in accordance with the present invention. System 500 includes a computer terminal 560 in communication with one or more of interface devices 550-1 through 550-4 and one or more external database 580. Interface devices 550 may be any device that is capable of receiving data from and/or transmitting data to a computer network, and may include a printer 550-1, camera 550-2, fingerprint scanner 550-3 or other interface device (such as bar code scanners, retina, scanners, personal digital assistants (PDAs), fax machines, telephones, etc.). It should be noted that, although one computer terminal 560 is shown in FIG. 5, system 500 may be configured such that a plurality of computers are in communication with one another, and configured for parallel processing by such plurality of computers.

Computer 560 preferably includes standard hardware components, such as RAM 510, central processing unit (CPU) 530, and a read only memory (ROM) 535. The CPU 530 is preferably linked to the RAM 510 and ROM 535, either by means of a shared data bus, or dedicated connections. The CPU 530 may be embodied as a single commercially available processor. Alternatively, in another embodiment, the CPU 530 may be embodied as a number of such processors operating in parallel. ROM 535 is operable to store one or more instructions, discussed further below in conjunction with functions 511–520, which the CPU 530 is operable to retrieve, interpret and execute. ROM 535 preferably stores processes for searching and accessing (function 511) a central link list (e.g., list 200 or 400). In addition, ROM 535 stores processes for associating central linked lists and list nodes (function 512), provide self-teaching (513) and logic placement (514) functions, provide a display from memory protocol (515), manage database updates (516), manage datacells (517), configure performance and stability attributes (518), manage synchronization (519) and recovery protocols (520), as described below.

The CPU 530 preferably includes a control unit, an arithmetic logic unit (ALU), and a CPU 530 local memory storage device, such as, for example, a stackable cache or a plurality of registers, in a known manner. The control unit is operable to retrieve instructions from the ROM 535. The ALU is operable to perform a plurality of operations needed to carry out instructions. The CPU 530 local memory storage device is operable to provide high-speed storage used for storing temporary results and control information.

The processes of accessing data of central linked list 200 to facilitate the searching of stored data in nodes 50, 55 of list 200, comparing received data with such stored data and storing received data that is not included in the data structure are described with reference to FIGS. 5 through 7. At the outset, as indicated in FIG. 7, stored data or attributes that are to be compared to received data are downloaded from database 710 into memory, such as RAM 510 as shown in FIGS. 5 and 7. During the data load, the data formation is created such that data is stored by data type—or into various data type buckets.

When data is transmitted by and received from an interface device 550, the content of the central linked list nodes are searched or compared, in accordance with an embodiment of the invention, to the input data of a hash function result (732), B– tree function result (734) or some other data searching algorithm (not shown). In addition to applying these search algorithms, the search or comparison can be performed using one of many available other comparison algorithms known in the art, such as B+ tree and/or AVL tree algorithms.

Figure 6:
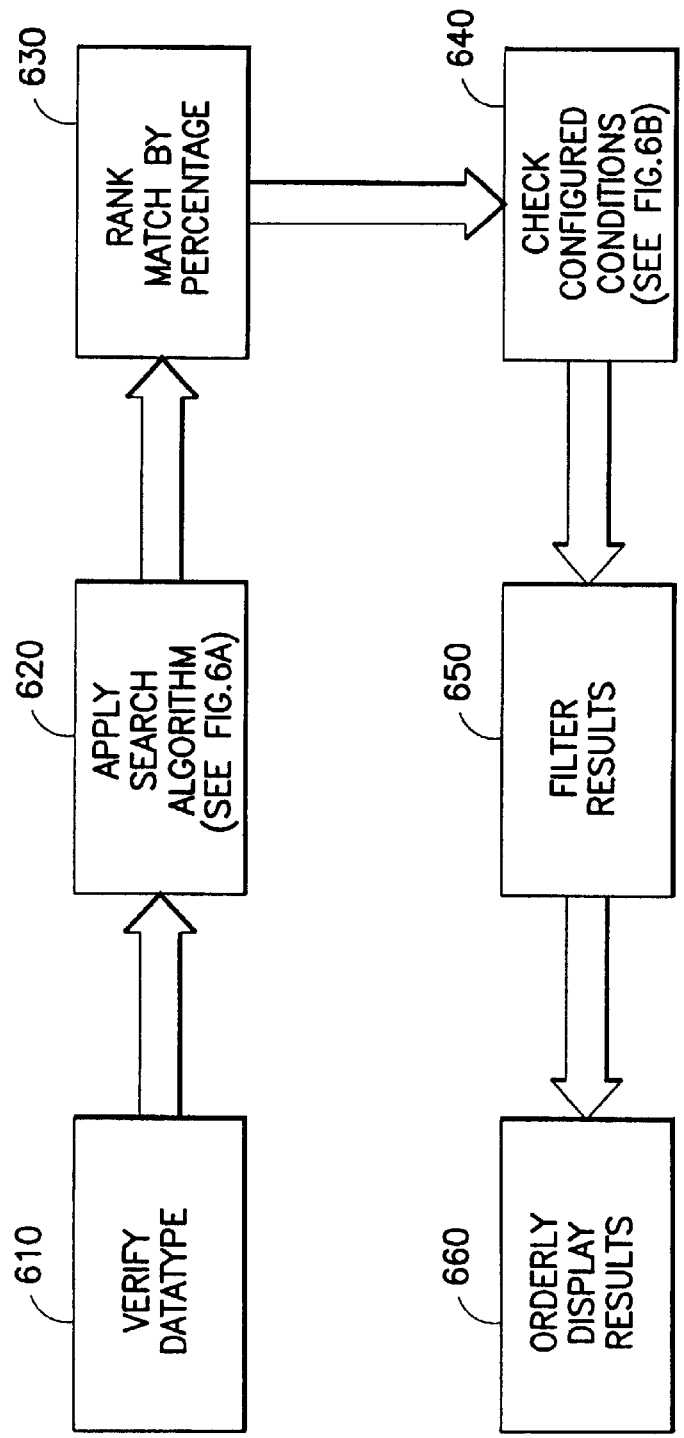
FIG. 6 is a flowchart for creating a central linked list data structure in accordance with the present invention.
Figure 7:
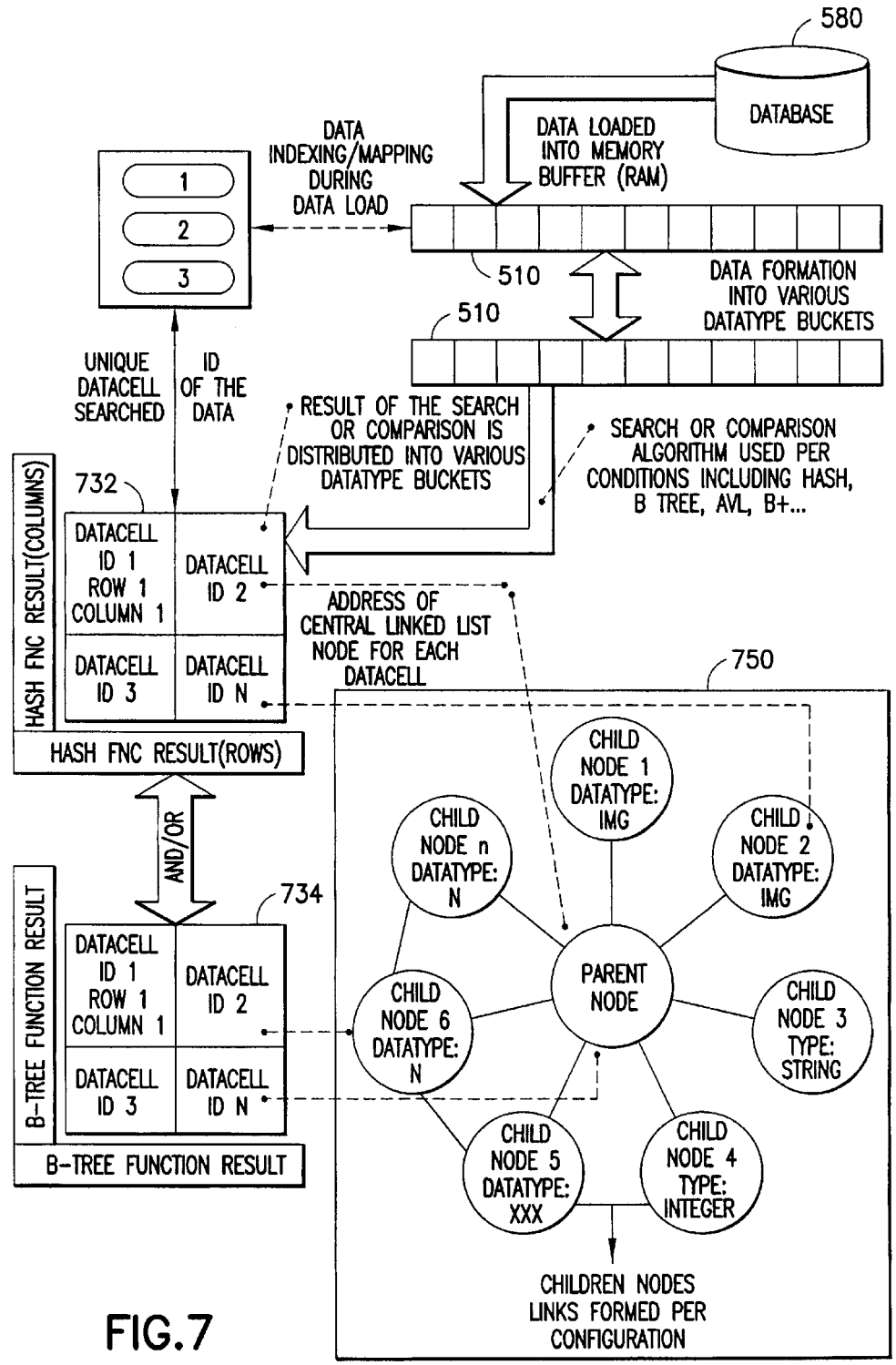
FIG. 7 illustrates an exemplary search function in accordance with an embodiment of the invention.

Referring to FIG. 6, upon receiving data from interface device 550, such as camera 550-2 or fingerprint scanner 550-3, an incoming search request is made for a specific type of data—e.g., image data, fingerprint information, RFID information, etc. CPU 520 verifies the data type identified in a parent node data field—e.g., by parent content attribute 62, and a search algorithm, such as B+ tree, B– tree, AVL tree and/or hash function algorithms, is applied at step 620.

Figure 6A:
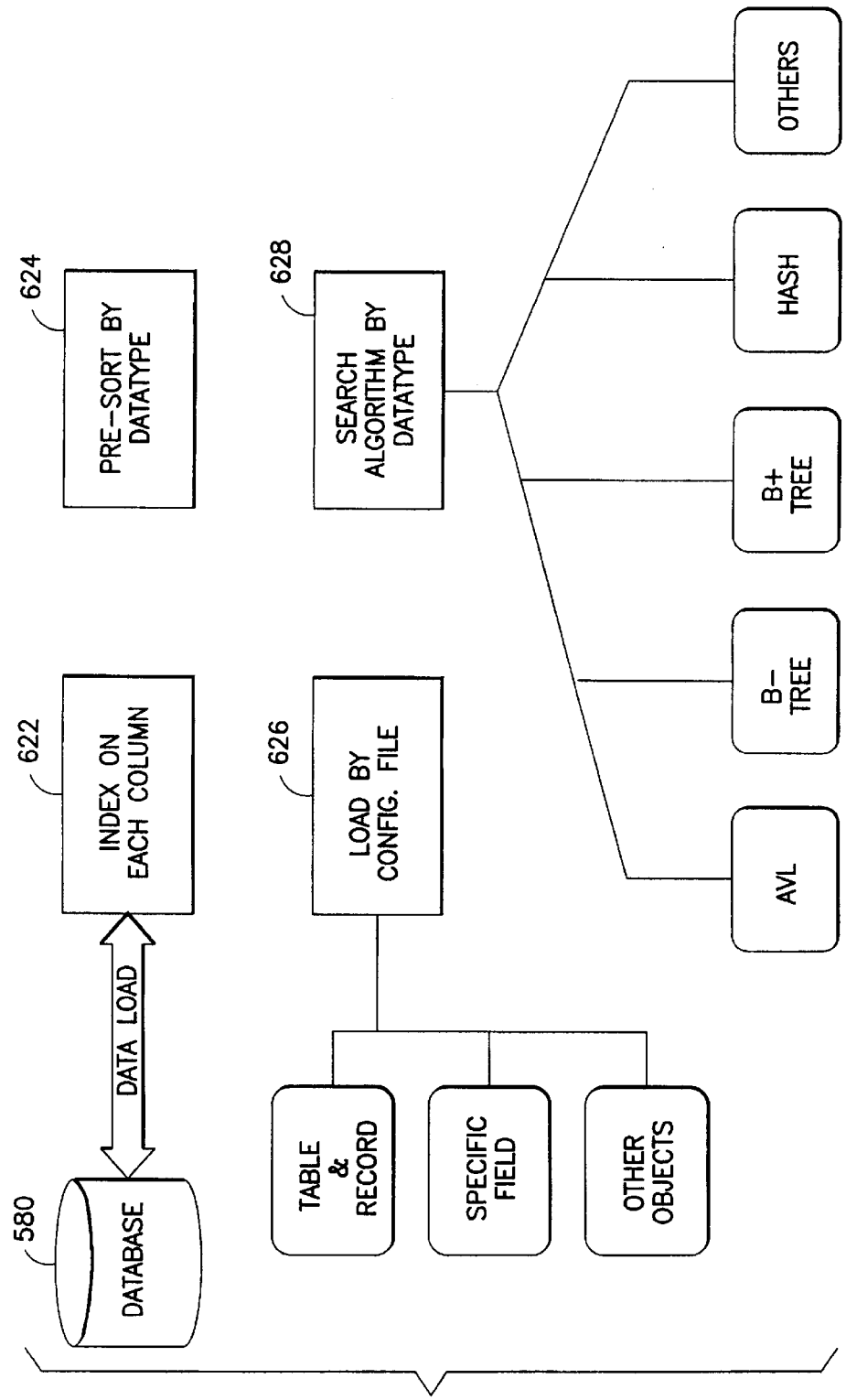
FIG. 6A illustrates the steps involved in applying a searching algorithm in accordance with an embodiment of the invention.

Applying the search algorithm (620) comprises four steps which are illustrated in FIG. 6A. At step 622, the downloading of data from a database, such as database 580, to RAM 510 of system 500 is commenced. As part of the download function, the data is mapped such that an index is created relating to the location of the data received from database 580 and the location of the corresponding data stored in RAM 510. As the data is being downloaded and indexed, the data is then presorted by datatype (624) and by pre-established configuration settings (626). (The configuration settings are described below with reference to FIG. 6B.) As data is being presorted, one or more search algorithms are selected, based upon the datatype, to identify the appropriate linkage for creating the central linked list.

By applying one or more of these algorithms, attributes of the verified data type of the received data and identified data types of the central linked list 200 are compared. Because the attribute information is stored in RAM 510, during the comparison, such system memory 510 (and not data from some other outside source, such as external database 580) is accessed.

In an embodiment of the invention, a hash function performs a transformation on an input and returns a number having a fixed length—the hash value. Properties of a hash function used in accordance with an embodiment of the invention include the ability to: (1) receive a variable-sized input and generate a fixed-size output, (2) compute a hash value relatively quickly for any input value, (3) be "one-way," i.e., the input cannot be determined by knowing the hash value, and (4) be substantially collision-free. Hash functions satisfying these criteria include the message digest 5 ("MD5") and secure hash algorithm ("SHA")-1 algorithms.

The MD5 algorithm, for example, generates a 16-byte (128-bit) hash value and is substantially collision-free. The SHA-1 algorithm may generate a 20-byte (160-bit) hash value. The maximum input length of a data block to the SHA-1 algorithm is 264 bits (~1.8×1019 bits). The design of SHA-1 is similar to that of MD5, but because its output is larger, it may be slower than MD5, although it is more collision-free. Depending on the system configuration for a given business requirements, any one or combination of the above mentioned algorithms (or other algorithms that are well known in the art) may be used for data search.

Returning to FIG. 6, if a match is made after applying the appropriate search algorithm (at step 620), a central linked list search engine returns a matching result based on a requesting criterion or criteria, such as data types, content, or the like, at step 630. Each specific node 50 containing the match or near match is embedded in the search results list, with "n" number of matching or near-matching nodes, including a matching percentage in an ordered list, e.g., a descending or ascending order list (step 630). During a matching search, the information of "n" number of matching nodes is returned to the requesting client, and the buffer that is used to keep the link is optionally cleared.

Figure 6B:
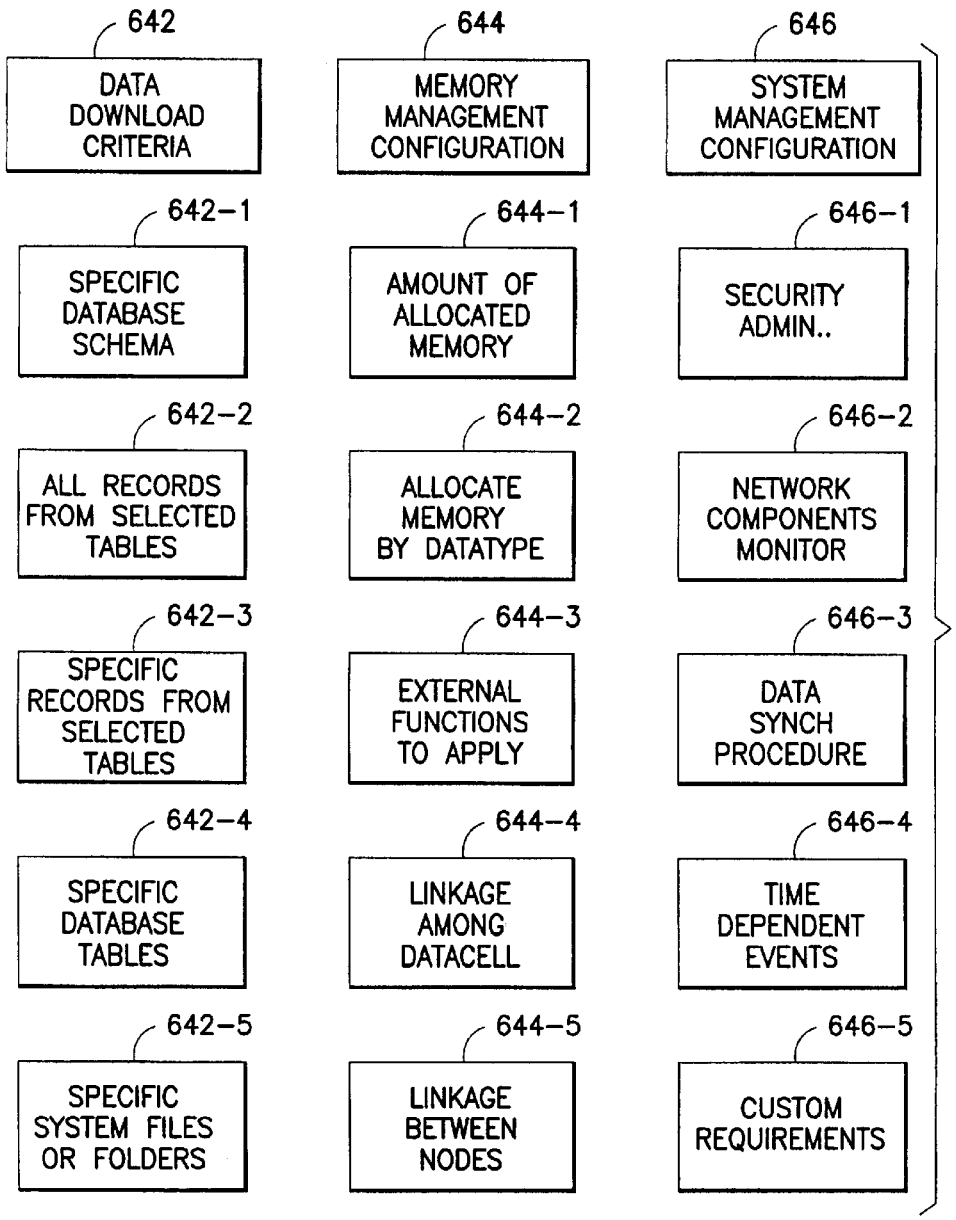
FIG. 6B illustrates the steps involved in configuring the storage of data in accordance with an embodiment of the invention.

Once the searched data is matched and ranked, the data is configured for storage (step 640) upon determining that such data does not already exist in memory. Thus, once the data has been downloaded, memory management configurations (644) and system management configurations (646) are considered for storing the data. Turning to FIG. 6B, configuration settings for storing data are illustrated. As illustrated in FIG. 6B, these configurations may be set such that they apply to entire database 642-1 or to specific system files or folders 642-5. In addition, the configuration settings may be applied to specific database tables 642-4, all records of a selected table 642-2 or specific records from selected tables 642-4.

Memory management configuration 644 considers the amount of memory that is allocated for the data item (644-1) to be stored and data item type (644-1). In addition, external functions that are applied to the stored data item (644-3) are considered. Thus, if the stored data relates to salary information, external functions such as related tax information is associated thereto; or if the information relates to trading of stocks, information relating to the type of stock that is being traded is associated. In addition, information relating to linkages among related datacells (644-4) and related nodes (644-5) are also associated with the stored data.

System management configurations 646 are also considered when storing data items. For example, the type of security applied to data (e.g., who can access certain information) (646-1) is associated with the data that is being stored. Further, the manner in which different types of data is allocated to different components (e.g., text data to certain servers, numbers to other servers) is also considered (646-2). This is accomplished, in accordance with an embodiment of the invention, using the simple network management protocol (SNMP) (i.e., a conventional protocol for managing network devices), simple screen management protocol (SSMP) (i.e., a conventional communications protocol for text-based terminals), or the like. In addition, data synchronization protocols are employed (646-3) for, for example, data that may change—such as an employee's salary. Moreover, a protocol may be associated with data items respecting time dependent events (646-4), such as updates to stock prices, that are to occur at a predetermined frequency. Other configurations may also be established (i.e., custom requirements (646-5)) to provide such customized settings as desired by a user.

Upon completing the search, finding one or more matches and storing the received data, the search output is filtered (step 650)—i.e., ROM 535 determines whether the search results are to be stored or displayed—and the output is then transmitted to the appropriate location (step 660)—e.g., a user's interface device, such as printer 550-1, monitor of terminal 560-1, database 580, etc. More specifically, upon request by client or by server applications, via TCP/IP or some other qualified protocol, the content(s) of sibling linked list nodes, that is, nodes in the same central linked list (such as resulting linked list 750 of FIG. 7) as the matched child node, can be displayed or otherwise output. In other words, a protocol respecting display from memory (function 515) may be effectuated. The search output includes: the matched child central linked list node content, and the image and/or other parameters of the matched child node's parent node. This output can be in any specified order, such as by data types, ID, and the like, (which is accessed directly from memory or RAM) or any combinations thereof. The content of other related parent nodes are then accessed directly from memory and displayed. Because the nodes' relations are mapped within each parent node as part of the central linked list property, as the data search is completed, the content in the parent node and its related nodes may be displayed according to user requirements based on the user's data access and privilege security level.

It should be noted that database updates (function 516) for central linked list 200 or 400 may not necessarily be from an internally-created relational database management system (RDBMS), meaning created from the same server, to store all the information. Central linked list 200 or 400 may be used instead to download information and data from an external RDBMS, and to update or upload the information back to the RDBMS. This updating function saves system processing time and resources. In addition, the central linked list data structures described herein (200, 400) enable an automated data fusion functionality—i.e., the capability for a server accessing such data structure to be configured to fuse data from various data sources for searching data stored therein.

It should be further noted that the central linked list data structures is database-independent. Although central linked list functions may contain database query code in a single module, no sequential query language (SQL) code or equivalent code is required. Data querying is performed via software development kit (SDK) functions call. An SDK contains several functions that may be called to perform a query or a datafile search. As such, an SDK document is available outlining the parameters to be used for each function call within the SDK. For example, at the server level, the SDK is used to configure the linkage of the pointers from child node to child node, or child node to parent node. Upon completion of data download, a client computer may call an child_img_locator function within the SDK to access child nodes images via its parent.

Thus, accessing a database is performed by direct function calls from engine code. Accordingly, when loading data from database to memory buffer, information is stored in the form of central linked list specification. In accordance with an embodiment of the invention, the data may be accessed via the function calls from the SDK or application programming interface (API) provided. Because these API and SDK functions are derived from functional class libraries, the parameters are provided specific to the system configuration and the specific address of the central linked list, and/or central linked list content to be searched.

Additional System Functionality

As illustrated in FIG. 5, in addition to storing and accessing data to perform searches (effectuating the central linked list searching functionality (or CLL search function 511) using a centralized data structure (such as data structure 200, 400 or 750 illustrated by FIG. 2, 4 or 7, respectively) as described above with reference to FIGS. 4–7, certain routine computing functions may be effectuated in a more expeditious fashion as a result of searching and accessing data from RAM. For example, as described more fully below, a central data structure such as central linked lists 200 or 400 assist in debugging software and thereby reduce memory leaks and other operating errors. In addition, these central linked lists enable improved logic placement functionality, database update management, datacell management, performance and stability configuration, synchronous management and recovery management. Further, the central linked list data structure may serve as a relational database representation in system memory and effectuates a self-teaching functionality.

System Reliability

Employing central linked list data structure 200 of FIG. 2, when a bug occurs, it is known which pointer 66, 76, 78 and which linked list node 50, 55 contains the bug(s), identified by its node name or ID and memory address 60, 70. Thus, the node (e.g., node 50 or 55) which needs to be debugged may be quickly identified and therefore an increase in system reliability functionality may be recognized. In accordance with an embodiment of the invention, central linked list 200 comprises a set of previously classified and/or qualified pointers 66, 76, 78. Qualified pointers nodes in turn contain specific class/group properties, as these pointers groups may be configured previously per specific business requirements. The linked lists that remain outside of the qualified properties may be rejected or flagged for configuration purpose. By employing the data structure of central linked list 200, however, common bugs—e.g., dereferencing of a bad pointer which causes corruption of the memory and thereby crashing an application at run time, or failure by a pointer allocation to automatically assign it to refer to a pointee, or from the sharing of a pointer reference—may be identified in an expeditious manner for correction.

Relational and Association Functionality

Another aspect of the present invention includes data relation and associating functions (512) shown in FIG. 5. As described above with reference to FIG. 4, central linked lists may be grouped together—i.e., one group of central linked lists may be related to another group of central linked lists. Further, one child node 85 within a group 400 of central linked lists may be associated with another child node 85 of the same group 400 of central linked lists. In general, central linked list 400 may be configured for grouping based on certain categories and/or other class properties. The grouping 400 of central linked list allows the system to perform relational data search in memory for increase of security, performance and stability (as described more fully below). Data may also be related based on content and data type, as nodes are linked to central linked lists of the same group 400. Similarly, one child node 85 within a group 400 of central linked lists can be related to another child node in a different group of central linked lists (not shown).

According to an embodiment of the central linked list, such as list 400, nodes 80, 85 continue to exist and are allocated in the heap with a call to malloc (i.e., memory allocation function or program to allocate memory from heap to create a linked list node header) until it is explicitly de-allocated by a call to free memory. The de-allocation function or program is effectuated to free memory from a linked list node header, thereby deleting the linked list. The data field 62, 64, 72, 74 contains content that is either an attribute or a full data description. Allocation steps therefore allocate resources for new central linked list nodes, while the de-allocation function is to release resources back to the system.

Child nodes 85 within central linked list group 400 are linked across all central linked list groups and inter-nodes. Thus, according to the hospital example described below, a data search for a missing patient can retrieve the patient's known image with images on surveillance cameras throughout the hospital. Logic and conditions are used for displaying, deleting, creating, and/or updating of central linked list child nodes, addresses, and content and to place various conditions on the nodes for search and retrieval, arithmetic and display. Because central linked list 400 resides in system virtual memory, logic and algorithms may be applied on real-time or close to real-time basis.

Further, central linked list functions allow each child node 85 within a central linked list group 400 to be linked and delinked from its parent node. Specifically, linking or delinking functions are employed to relate or un-relate a central linked list node to another node. The functions form or terminate a relationship between the two nodes, whether it be a parent node to a child node, or a child node to another child node, or a parent node to another parent node. The central linked list groups are related and unrelated from one another. In addition, groups of central linked list nodes can be deleted, created and updated.

Self-Teaching and Logic Placement

As illustrated in FIG. 5, the data structure of the present invention allows for a self-teaching data comparison function(function 513). Input into the system memory 510, including data in text, image, numbers, etc., may be configured to be compared to data that exists in the central linked list in-memory. If the data did not exist previously in memory, the system may then insert it into the in-memory database. Specifically, a central linked list contains data or attributes about certain objects, which may be an image, data in binary or other data type, to be compared. The data may be downloaded from a database, or may be inserted at run time. As each object, whether it may be data in picture or text, is captured for comparison by data download or by any third party software/system, it is compared to other similar objects in database or in memory. If the object exists in memory, it is then displayed; otherwise, the object may be inserted into the system virtual memory. During the record insertion into memory, some logical steps and algorithms based on the current conditions are used to aid the system in determining if the object should derive from the same central linked list group or should be of different central linked list group. The central linked list uses several logic placement functions (514) to apply on all nodes. Examples of the logic placement may include applying the conditions to execute external/internal functions to alter or to view the content within the central linked list nodes.

Performance and Stability Configuration

The performance and stability configuration function (518) of the present invention, shown in FIG. 5, allows the data structure to be used in a system or searched at peak performance and stability. System performance and stability parameters may be configured via a file that resides in the system 500 which contains the configuration considerations described above with reference to FIG. 6B. The configuration file may be updated automatically by the system or manually for custom configurations. These configuration settings relate to running a startup file, parsing of data, loading data into memory, writing events and error logs, performing initial upload and preparing other required system operations.

Synchronization Management

Synchronization management functions (519) allow system 500 (of FIG. 5) to synchronize the content of its memory in RAM buffers to either external or internal databases for permanent storage. Synchronized management functions operate as a background thread to handle synchronization processes. Data systems often include a meta buffer for temporarily holding data. If the usage of the meta buffer matches or is over the high water mark (a default is, e.g., 90%), meaning the high limit of the memory buffer occupancy, then the thread which meets this condition is used to tell the background thread to perform a least used record (LUR) function in order to make available node buffers. When a node is removed based on this LUR functionality, its central linked list group nodes are removed at the same time. Accordingly, because reading and writing to a hard disk is a relatively slow process which can consume considerable processing resources, the synchronized storage operation reduces the amount of time needed to read and write to a hard disk.

Recovery Management

According to another feature of the present invention, in case of power failure or other total system failure, the central linked list can be configured to recover information at the restarting stage (function 520). The recovery function relies upon a setup procedure as a handling process.

When restarting the computer after a failure, the engine checks whether the central linked list history data file exists without corruption. If the central linked list history file exists without corruption, the restarting page is built from the meta buffer based on the central linked list history file. Thus, the recovery is much faster for not having to access a hard disk or other slow memory device. If the central linked list history file does not exist or is corrupted, the meta buffer contents are restored from the appropriate database(s), double-checking a log file for possible recovery.

Representative Application of Central Linked List

As described above, central linked list data structures in accordance with the present invention, such as list 200 or 400, of FIGS. 2 and 4, respectively, allow a system to perform data searching functions on a real-time or close to real-time basis. The functions operate as a relational database, yet remain in system physical memory, such as RAM 510. Such functionality obviates the need to depend on hard drive capacity (spin speed, connection, availability, etc.) as required by typical relational databases. Thus, various data specific to an object, such as data representing images of a human face at various angles with each image or reading stored in a child node 55, may be searched, processed, and compared without accessing a hard disk.

In accordance with an embodiment of the invention, FIG. 5 is configured to accept data relating to a person's image at any angle, and with sufficient data stored in physical memory, identify such a person. One way that this may be accomplished is by accessing a central linked list, e.g., list 200 or 400, by operating software for handling a combination of radio frequency identification (RFID) and image facial recognition. For example, an application can be developed using central linked list 200 and system 500 as general entry application for a hospital. Thus, when checking in to a hospital, a patient may be photographed by camera 550-2, may have his fingerprint scanned by scanner 550-3, and provided with a wristband RFID tag. In the background, the system may perform the following tasks using the central linked list 200: storing the person's picture images in RAM 510 and hard drive database 580 to identify, compare, and check with, e.g., a criminal database; relying on the fingerprint scan for positive identification of the patient and thereby reducing the chance of errors made by facial recognition; relying on the RFID for wireless identification, and also as a wireless transport protocol for biometrics, for locating identification throughout the hospital, and for matching associated data and previous medical records.

Thus, if, for example, the patient's friends or family members visits the patient at the hospital, each individual may be logically associated with the patient (i.e., grouped together as a linked list), positively identified via biometrics and facial recognition, located by RFID smart card, monitored and recorded movement about the hospital through, for example, the surveillance cameras. In the above scenario, in real time or close to real-time, the system stores the patient's facial image at different angles, records, RFID tag id, and fingerprint scan image in one datacell or one central linked list. Each linked list node stores an image/reading/record that belongs to that person, and various central linked list nodes may then be linked according to the pre-defined relationship with associated members.

The foregoing merely illustrates the principles of the invention. It will thus be appreciated that those skilled in the art will be able to devise numerous other arrangements which embody the principles of the invention and are thus within its spirit and scope.

For example, system 500 is disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors in communication with a central linked list data structure described herein.

What is claimed is:

1. A data structure for organizing data, comprising:
   a parent node stored in a first memory;
   a first child node stored in a second memory;
   a second child node stored in a third memory;
   a third child node stored in a fourth memory;
   a first link connecting said parent node to said first child node, said first link comprising a first pointer directing a program from said parent node to said first child node and a second pointer directing said program from said first child node to said parent node;

a second link connecting said first child node to said second child node, said second link comprising a third pointer directing said program from said first child node to said second child node and a fourth pointer directing said program from said second child node to said first child node;

a third link connecting said second child node to said third child node, said third link comprising a fifth pointer directing said program from said second child node to said third child node and a sixth pointer directing said program from said third child node to said second child node; and a fourth link connecting said parent node to said second child node.

2. The data structure of claim 1, wherein said first child node stores a first data item.

3. The data structure of claim 2, wherein said second child node stores a second data item.

4. The data structure of claim 2, wherein said parent node has a first attribute describing said data structure.

5. The data structure of claim 4, wherein said first child node has a second attribute describing said first data item.

6. The data structure of claim 5, wherein said first memory has a first memory address and said second memory has a second memory address.

7. The data structure of claim 6, wherein said first pointer directs said program to said second memory address and said second pointer directs said program to said first memory address.

8. The data structure of claim 1, further comprising a second parent node, wherein said second parent node is linked to said parent node.

9. The data structure of claim 1, further comprising a second parent node, wherein said first child node is linked to said parent node and to said second parent node.

10. The data structure of claim 5, wherein said second child node has a third attribute describing said second data item.

11. The data structure of claim 10, wherein said second attribute and said third attribute describe a relationship between said first data item and said second data item, when said second attribute and said third attribute are logically related.

12. The data structure of claim 1, wherein said parent node, said first child node and second child node are stored in a plurality of memory devices.

13. A method for generating a data structure comprising:

creating a parent node in a first memory, a first child node in a second memory, a second child node in a third memory, and third child node in a fourth memory; and linking said parent node to said first child node by creating a first pointer directing a program from said parent node to said first child node and a second pointer directing a program from said first child node to said parent node;

linking said first child node to said second child node by creating a third pointer directing a program from said first child node to said second child node and a fourth pointer directing a program from said second child node to said first child node;

linking said second child node to said third child node by creating a fifth pointer directing a program from said second child node to said third child node and a sixth pointer directing a program from said third child node to said second child node; and linking said parent node to said second child node.

14. The method of claim 13, wherein said first child node stores a first data item.

15. The method of claim 14, wherein said first child node stores a first data item.

16. The method of claim 14, further comprising associating a first attribute with said parent node, said attribute describing said data structure.

17. The method of claim 16, further comprising associating a second attribute with said first child node, said second attribute describing said first data item.

18. The method of claim 17, further comprising associating a first memory address with said first memory and a second memory address with said second memory.

19. The method of claim 18, wherein said first pointer directs said program to said second memory address and said second pointer directs said program to said first memory address.

20. The method of claim 13, further comprising creating a second parent node, and linking said second parent node to said parent node.

21. The method of claim 13, further comprising creating a second parent node, and linking said first child node to said parent node and to said second parent node.

22. The method of claim 17, further comprising associating a third attribute with said second child node, said third attribute describing said second data item, said second attribute and said third attribute are logically related.

23. The method of claim 22, wherein said second attribute and said third attribute describe a relationship between said first data item and said second data item, when said second attribute and said third attribute are logically related.

24. The method of claim 13, wherein said parent node, said first child node and second child node are created in a plurality of memory devices.

25. Computer executable software code stored on a computer readable medium, the code for creating a data structure, comprising:

code for creating a parent node in a first memory, a first child node in a second memory, a second child node in a third memory, and a third child node in a fourth memory;

code for directing a program from said parent node to said first child node and from said first child node to said parent node;

code for directing said program from said first child node to said second child node and from said second child node to said first child node;

code for directing said program from said second child node to said third child node and from said third child node to said second child node; and code for directing said program from said parent node to said second child node.

26. The computer executable software code according to claim 25, wherein said first child node stores a first data item.

27. The computer executable software code according to claim 26, wherein said first child node stores a first data item.

28. The computer executable software code according to claim 26, further comprising code for associating a first attribute with said parent node, said attribute describing said data structure.

29. The computer executable software code according to claim 28, further comprising code for associating a second attribute with said first child node, said second attribute describing said first data item.

30. The computer executable software code according to claim 29, further comprising code for associating a first memory address with said first memory and a second memory address with said second memory.

31. The computer executable software code according to claim 30, wherein said first pointer directs said program to said second memory address and said second pointer directs said program to said first memory address.

32. The computer executable software code according to claim 25, further comprising code for creating a second parent node, and linking said second parent node to said parent node.

33. The computer executable software code according to claim 25, further comprising code for creating a second parent node, and linking said first child node to said parent node and to said second parent node.

34. The computer executable software code according to claim 29, further comprising code for associating a third attribute with said second child node, said third attribute describing said second data item said second attribute and said third attribute are logically related.

35. The computer executable software code according to claim 34, wherein said second attribute and said third attribute describe a relationship between said first data item and said second data item, when said second attribute and said third attribute are logically related.

36. The computer executable software code according to claim 25, wherein said parent node, said first child node and second child node are created in a plurality of memory devices.

37. A data structure for organizing data, comprising:
a parent node stored in a memory location;
a plurality of N child nodes ($C_1, C_2, \ldots, C_N$) stored in a plurality of N corresponding memory locations, wherein N>2;
wherein said parent node comprises a pointer to each of said N child nodes, each of said child nodes comprises a pointer to said parent node, each child node $C_i$, where 1<i<N, further comprises a pointer to the next child node $C_{i+1}$, and each child node $C_i$, where $1 \leq i \leq N$, further comprises a pointer to the previous child node $C_{i-1}$.

38. The data structure according to claim 37, wherein child node $C_N$ further comprises a pointer to child node $C_1$.

39. The data structure according to claim 37, wherein each child node $C_i$ further comprises a pointer to child node $C_N$.

40. The data structure according to claim 37, wherein at least two of said plurality of N memory locations are on a single chip.

41. The data structure according to claim 38, wherein at least one of said plurality of N child nodes further comprises a data item.

42. The data structure according to claim 37, wherein at least one child node further comprises an attribute describing a data item stored in a memory location different than the memory location of said at least one child node.

43. The data structure according to claim 42, wherein said data item comprises an image.

44. The data structure for organizing data, comprising:
a parent node stored in a first memory location;
a first child node stored in a second memory location;
a second child node stored in a third memory location; and
a third child node stored in a fourth memory location;
wherein said parent node comprises a pointer to each of said first, second and third child nodes; said first child node comprises a pointer to said parent node and said second child node; said second child node comprises a pointer to said parent node, said first child node, and said third child node; and said third child node comprises a pointer to said second child node and said parent node.

45. The data structure according to claim 44, wherein said third child node further comprises a pointer to said first child node.

* * * * *